No. 768,891.

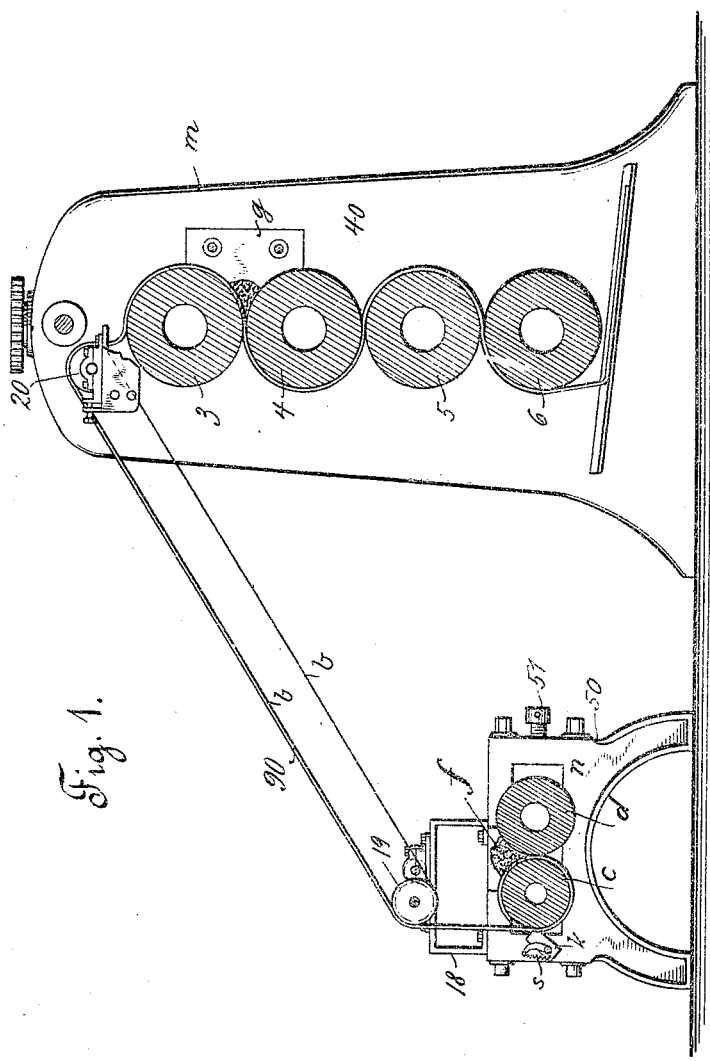

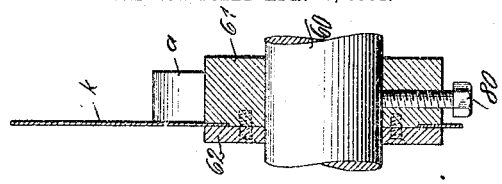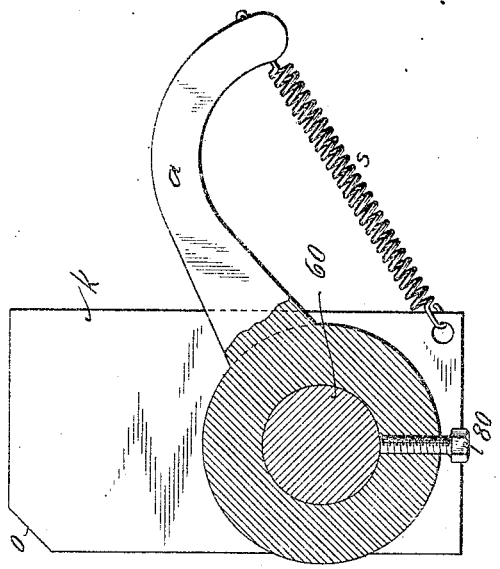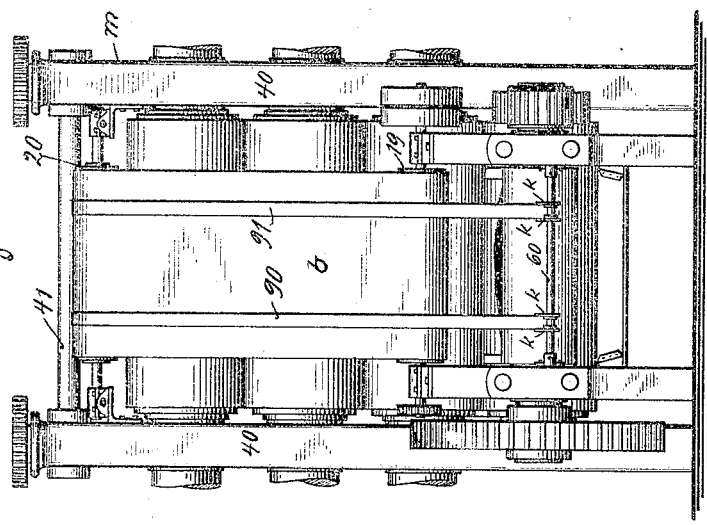

Patented August 30, 1904.

UNITED STATES PATENT OFFICE.

EDWARD F. ACKERMAN, OF PASSAIC, NEW JERSEY, ASSIGNOR TO THE OKONITE COMPANY (LIMITED), OF NEW YORK, N. Y., A CORPORATION OF GREAT BRITAIN.

MACHINERY FOR PREPARING RUBBER SHEETS OR STRIPS.

SPECIFICATION forming part of Letters Patent No. 768,891, dated August 30, 1904.

Application filed April 20, 1904. Serial No. 204,071. (No model.)

*To all whom it may concern:*

Be it known that I, EDWARD F. ACKERMAN, a citizen of the United States, and a resident of Passaic, in the county of Passaic and State of New Jersey, have made certain new and useful Improvements in Machinery for Preparing Rubber Sheets or Strips, of which the following is a specification.

My invention relates to improvements in machines for preparing rubber in the form of sheets or strips for use in making insulated wire, rubber belting, and for other purposes; and the objects of my improvements are, first, to economize in manual labor—that is, in the number of hands employed—and, second, to provide the plastic rubber or rubber compound with uniform accuracy as regards the rate of supply, which rate shall be substantially equal to the rate at which the calendering-machine can receive and dispose of such rubber compound whatever may be the distance separating the rolls of said machine. I attain these objects by automatically measuring out the supply and conveying the supply of rubber compound in a measured stream, strip, or sheet to the upper roll of the calendering-machine, where it is taken by the first roller and passed thence through each pair of rollers in succession to form a sheet or strip ready for use.

The accompanying drawings illustrate my invention.

Figure 1 is a sectional side view of the complete apparatus. Fig. 2 is a face view of the apparatus viewed from the left-hand side of Fig. 1. Fig. 3 is a side view of one of the cutters or knives with its supporting and adjusting devices, and Fig. 4 is a sectional view of the same.

In Fig. 1, $m$ is the machine. 3, 4, 5, and 6 are four rollers steam-heated from the interior and provided with means for varying the distance separating each pair. These rollers are supported in bearings between vertical standards 40, connected by rods 41, and said rollers are supplied with suitable connecting gear-wheels and driving power. $g$ indicates guide-plates closely fitting the surface of adjacent rollers, as shown, to prevent the rubber compound spreading over the ends of the rolls. $n$ is a device for automatically preparing the rubber compound for the calendering-machine. It consists of two rollers $c$ and $d$, journaled in standards, like 50, rotated in opposite directions and toward each other, with means, like screw 51, for adjusting the distance between said rollers. Rubber or rubber compound $f$, suitably prepared and rendered plastic by heat, is placed between these rollers $c$ and $d$, by which it is pressed into a sheet of any desired thickness. After passing between the rollers $c$ and $d$ it is cut into a strip of such width as will constitute the rate of supply desired. For this purpose a fixed shaft and adjustable knives are provided. The fixed shaft or arbor 60 is held in the frame of the machine $n$.

$k$ is a knife located on a ring 61 and rotatable in the slit between the ring 61 and the ring 62. The ring 62 is fastened to the ring 61 by screws or in any convenient manner. Integral with the ring 61 is an arm $a$. A retracting-spring $s$ extends from the free end of arm $a$ to the lower corner of the knife or cutting device $k$. This knife or cutter $k$ is a thin sheet of steel, preferably rectangular and having a straight-line cutting edge, as at $o$. The edge $o$ is pressed by the spring $s$ into engagement with the roller $c$, forming part of the machine $n$. There are four of these knives shown in Fig. 2. The construction of each is identical, and I may use one pair or two pairs or more, as desired.

On a frame 18, fixed to the top of the machine $n$, is journaled a roller 19, and on the machine $m$, slightly to one side of a vertical central line, is journaled a roller 20. An endless belt $b$, preferably of canvas and rubber, extends over the rollers 19 and 20. The roller 19 is driven by a pulley and a belt connected with the power-shaft. The belt $b$ should be as wide as can be employed on the machine $m$, and the length of the rollers $c$ and $d$ is substantially equal to the length of the rollers 3 4, &c. The rubber compound $f$, rendered suitably plastic by heat, is manually placed between the rollers $c$ $d$ and is pressed into a sheet depending for its thickness upon the extent of separation of said rollers. It is carried or guided around the roller $c$ and into engagement with the belt $b$. As it passes under the knives $k$ it is cut into one or more strips, the width of the strip depending on the extent of separation of each pair of knives. These knives are adjustable upon their support 60 by use of the set-screw 80. For this purpose each knife is located upon a ring 61, and this ring 61 may be moved along the shaft or support 60, and the ring 61 is held in position at any point by its set-screw 80. By the proper separation of these knives and the proper separation of the rolls $c$ $d$ the supply of rubber compound $f$ passing over the belt $b$ in the form of strips or sheets is made substantially equal to the demand of the calendering-machine $m$, which demand is dependent upon the extent of separation and rate of motion of the rollers 3 4 5 6, so that in order to automatically supply the machine $m$ without permitting undue accumulation between the first pair of rollers 3 and 4 I adjust the supply by varying the distance between the rollers $c$ and $d$ and between the knives $k$, and I sometimes use two pairs of knives to supply two strips of rubber compound 90 and 91, as shown in Fig. 2, delivering this supply at separated points on the calendering-machine $m$, or I may employ only one pair of knives $k$ and supply the rubber compound to the machine $m$ in a single strip or sheet.

What I claim, and desire to secure by Letters Patent, is—

1. The combination of a calendering-machine having a series of heated rolls arranged in a vertical plane, a machine for preparing rubber or rubber compound having adjustable rollers to vary the thickness and adjustable cutters to vary the width of the sheets or strips supplied to the first-named machine; an endless belt or moving surface located at an angle with respect to the horizontal extending from one machine to the other whereby material may be adhesively conveyed from the exit of one machine to the entrance of the other.

2. The combination of a calendering-machine with a machine for preparing rubber or rubber compound, an endless belt or moving medium having a surface to which the rubber compound readily adheres, said belt being located at an angle with respect to the horizontal and means for forming said rubber or rubber compound into a sheet or strip and causing it to engage said belt or moving surface.

3. The combination of a calendering-machine with a machine for preparing rubber or rubber compound, an endless belt or moving surface extending from one machine to the other whereby material is supplied to the calendering-machine at a fixed rate with a pair of knives or cutters located between the rollers of the preparing-machine and said belt or moving surface.

4. The combination of a calendering-machine and a machine for preparing rubber or rubber compound, an endless belt or moving surface for conveying material from one machine to the other; a pair of rolls to regulate the thickness of the rubber sheet or strip supplied to the calendering-machine and a pair of knives located at a point between said rolls and said belt to determine the width of said strip or sheet.

5. The combination of a calendering-machine with means for supplying rubber or rubber compound thereto including a pair of adjustable rollers to regulate the thickness of the supplied sheet or strip, an endless belt or moving surface extending from said rolls to said machine and a pair of knives located between said rolls and said belt to determine the breadth of said sheet or strip.

6. The combination of a calendering-machine with means for supplying rubber or rubber compound thereto including a pair of adjustable rollers to regulate the thickness of the supplied sheet or strip; an endless belt or moving surface extending from said rolls to said machine and two or more pairs of knives or cutting devices located between said rolls and said belt to determine the breadth of the sheets or strips supplied to said machine.

7. The combination of a calendering-machine with means for supplying it with rubber or rubber compound, said means including a pair of adjustable rolls; an endless belt or moving surface extending from said rolls to said machine and one or more pairs of knives located between said rolls and said belt.

EDWARD F. ACKERMAN.

Witnesses:
Wm. F. Gaston,
Frank B. Colman.